3,310,470
ANDROSTANE-1α,3α,17β-TRIOL AND FATTY ACID ESTERS THEREOF

Paul-Eberhard Schulze and Alfred Popper, Berlin, Germany, assignors to Schering Aktiengesellschaft, Berlin, Germany
No Drawing. Filed Oct. 19, 1964, Ser. No. 404,925
Claims priority, application Germany, Nov. 9, 1963, Sch 34,139
12 Claims. (Cl. 167—74)

The object of this invention is to provide processes for the production of androstane-1α,3α,17β-triol and its esters which have not been previously described.

The compounds produced according to this invention correspond to the general formula—

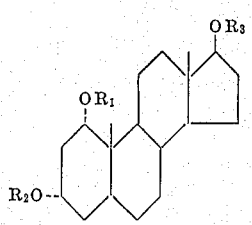

In the general formula $R_1$, $R_2$ and $R_3$ represent hydrogen or the acyl of an acid used for esterification of a steroid alcohol. $R_1$, $R_2$ and $R_3$ can be the same or different. Examples of acids suitable for esterification are: Acetic acid, chloroacetic acid, dichloroacetic acid, propionic acid, butyric acid, diethyl acetic acid, enanthic acid, caproic acid, undecylenic acid, cyclopentyl propionic acid, succinic acid, phenylacetic acid, furan carboxylic acid, phenoxy acetic acid, caprinoic acetic acid, benzoic acid, etc.

The new compounds possess high anabolic activity and at the same time have an extraordinary favourable ratio of their main anabolic activity relative to their undesirable androgenic side effect as shown by the following tabulation of the subcutaneous effects as compared with the effect of testosterone propionate which is rated as 1.

All substances were tested on castrated male rats weighing between 80 and 100 g. by subcutaneous injection of 1.0 mg. a day from twelve days to fourteen days. As a measure of the anabolic effect the increase of the weight of the musculus levator ani was determined, while as a measure of the androgenic effect the increase of the weight of the seminal vesicle was measured. A method of performing the test of anabolic and androgenic effect is disclosed in the publication Hershberger et al: Proc. Soc. Exper. Biol., 83, 175 (1953).

| Substance | Anabolic | Androgenic | Anabolic: Androgenic |
|---|---|---|---|
| Testosterone propionate | 1 | 1 | 1 |
| Testosterone | 0.14 | 0.06 | 2.3 |
| 4-chlor-testosterone-17-acetate | 0.1 | 0.03 | 3.3 |
| Androstane-17β-ol-3-one | 0.3 | 0.05 | 6 |
| Androstane-1α,3α,17β-triol | 2–3 | 0.2–0.3 | 10 |
| Androstane-1α,3α,17β-triol-17-capronate | 2 | 0.4 | 5 |
| Androstane-1α,3α,17β-triol-3-acetate | 1 | 0.1 | 10 |

In comparison with the anabolic action of the commercial 4-chlor-testosterone-17-acetate and androstane-17β-ol-3-one, the anabolic activity is greatly increased and the effective ratio of anabolic to androgenic activity improved. Furthermore, the higher esters of androstane-1α,3α,17α-triols have a prolonged anabolic effectiveness which is advantageous.

The new androstane-1α,3α,17α-triols of this invention and their esters are used for the production of anabolically active healing agents for subcutaneous application. The production of this healing agent is accomplished by mixing the active ingredients with the usual inert carrier substances of the Galenic pharmacy, e.g. sesame oil, peanut-oil, cottonseed oil, castor oil, starch paste, corn starch, magnesium stearate, sugar syrup, sugar, flavoring agents, etc.

The new compounds are produced by the known methods of steroid chemistry, such as shown in the section, "Testicular Hormones (Androgens)," in the Kirk and Othmer Encyclopedia of Chemical Technology of 1951, in vol. 7, pages 529–535. The "Testicular Hormones (Androgens)" article also discloses the utility, physical and chemical properties, bioassay methods and a table of twenty-five related androgenic substances.

Preferred starting materials are the above-mentioned androstane-1α,17β-diol-3-one and its esters, the 3-keto groups of which can be reduced to a mixture of the two epimeric androstane-1α,17β-3-ols by known methods, e.g. by hydrogenation in the presence of platinum oxide in glacial acetic acid. The mixture is then separated in the usual manner by chromatography.

Instead of using previously prepared androstane-1α,17β-diol-3-one, it is also possible to begin with suitable precursors thereof, such as 1α,2α-oxido-androstane-17β-ol-3-one or androstane-17β-ol-1,3-dione, which forms the desired 1α-hydroxyl group under suitable reducing conditions simultaneously with or even after the formation of the 3α-hydroxyl group. These methods of production are of special practical significance in cases where an androstane-1α,3α,17β-triol which is only partially esterified in certain places is to be produced. The following reaction schemes are used:

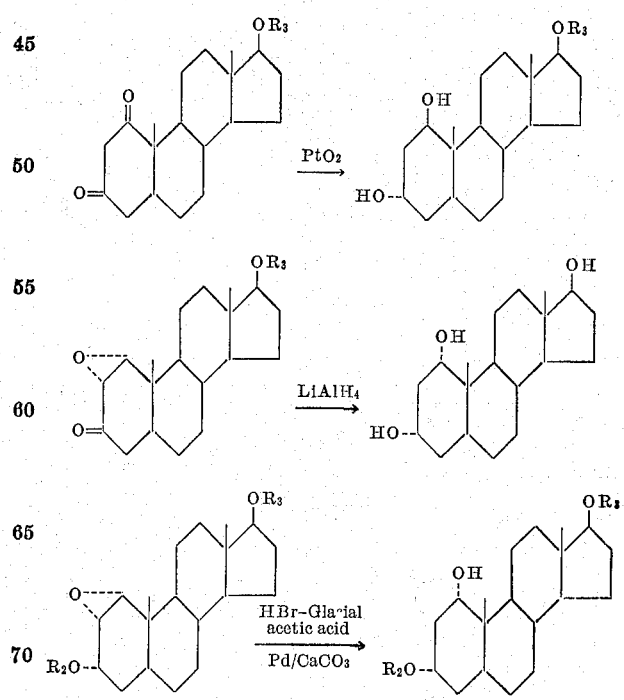

3

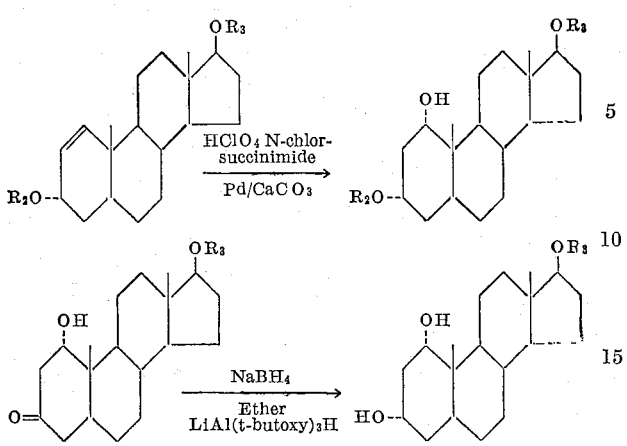

By subsequent esterification of the mono- or diesters, mixed di- or triesters are produced in the usual manner, which are then converted directly into difficultly producible esters by partial saponification.

Methods of chromatography used throughout the following examples are disclosed in the section "Chromatography" in Kirk and Othmer's "Encyclopedia of Chemical Technology," vol. 3 (1949), pages 928–35.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

10 g. 1α,2α-oxido-androstane-3-one-17β-ol are dissolved in one liter ether which has been dried over lithium aluminum hydride. This solution is added dropwise to a suspension of 5 g. lithium aluminum hydride in 500 ml. ether (likewise dried). The mixture is heated three hours with stirring under reflux and water is then added carefully with cooling until the lithium aluminum hydride has been completely reacted. The ether phase is separated and the aqueous alkaline phase extracted several times with ether. The ether fractions are then combined, washed to neutrality, dried and concentrated. Ten g. crude product were obtained. M.P. 180–200° C. The crude mixture is chromatographed on 25 times its amount of neutral aluminum oxide and elutriated with an ether/ethylacetate mixture (with increasing ethyl acetate content). The yield is 30–40% theoretical androstane 1α,3α,17β-triol with a M.P. of 218–220° C. By further elutriation with ethyl acetate/methanol, the 1α,3β,17β-triol compound is obtained.

EXAMPLE 2

Two g. androstane-17β-ol-1,3-dione are dissolved in 500 ml. ether and in the course of 20 minutes are added dropwise to a suspension of 2 g. lithium aluminum hydride in 200 ml. ether at the boiling temperature with stirring. After 3 more hours of stirring under reflux, the lithium aluminum hydride is decomposed by the dropwise addition of water, the product is then prepared as in Example 1. The crude substance is chromatographed, producing a yield of androstane-1α,3α,17β-triol similar to that of Example 1.

EXAMPLE 3

Two g. androstane-17β-ol-1,3-dione are dissolved in 80 ml. glacial acetic acid and in the presence of 100 mg. platinum oxide hydrogenated 30 minutes, with an absorption of 2 mols hydrogen. After no more is absorbed the catalyst is filtered off and the hydrogenated solution poured into 200 ml. water, the precipitated product being then filtered off with suction and dried. By chromatography there is obtained about 1 g. of the androstane-1α,3α,17β-triol of Example 1.

EXAMPLE 4

Five g. of 1α,2α-oxido-androstane-3α,17β-diol-3α,17β-diacetate are disolved in 50 ml. 30% hydrobromic acid in glacial acetic acid at 10° C. and allowed to stand one hour. The solution is then poured into ice water and the precipitated product filtered off, washed neutral and dried.

The crude product thus obtained is dissolved in 100 ml. of a tetrahydrofuran-methanol mixture (1:1). After the addition of one ml. acetic acid and 1.5 g. sodium acetate it is hydrogenated in the presence of 500 mg. palladium/CaCO$_3$ (5%). After 1.05 mols hydrogen have been absorbed the hydrogenation is discontinued, the product filtered from the catalyst and the clear reaction solution concentrated to 15 ml. and poured into 200 ml. ice water. The resulting precipitate is filtered off with suction, washed neutral and dried. After recrystallization from isopropyl ether the yield is 3.2 g. androstane-1α,3α,17β-triol-3α,17β-diacetate.

EXAMPLE 5

Two g. androstane-1α,3α,17β-triol are dissolved in 5 ml. acetic anhydride and 15 mol glacial acetic acid. After heating two hours to 60° C. and allowing to stand at room temperature another two days, ten times its amount of pyridine-containing ice water is poured in. After extraction with ether, the ether extract is concentrated in the usual manner. For purification the product is chromatographed on aluminum oxide and elutriated with methylene chloride/chloroform. After recrystallization from isopropyl ether, the yield is 1.5 g. pure androstane-1α,3α,17β-triol-17β-acetate with a M.P. of 200–201° C.

EXAMPLE 6

One g. androstane-α,3α,17β-triol is dissolved in 5 ml. pyridine and 2.5 ml. acetice anhydride added. The solution is allowed to stand overnight, is then heated two hours to 100° C., poured into ice water, stirred two hours and filtered with suction. After recrystallization from isopropyl ether, the yield is 1.1 g. pure androstane-1α,3α,17β-triol-1α,3α,17β-triacetate.

EXAMPLE 7

One g. androstane-1α,3α,17β-triol-17β-acetate is dissolved in 5 ml. pyridine and reacted with 2.5 ml. caproic anhydride. It is allowed to stand overnight, is heated ten hours to 100° C., poured into ice water, stirred one hour, extracted with ether and washed neutral. The crude substance is then chromatographed on 50 times its amount of silica gel. It is elutriated with benzene/methylene chloride (with increased amounts of methylene chloride). The yield is 1.2 g. pure androstane-1α,3α,17β-triol-dicaproate-17β-acetate. M.P. 71–72° C.

EXAMPLE 8

One g. androstane-1α,3α,17β-triol is dissolved in 3 ml. caproic anhydride and 2 ml. caproic acid and is allowed to stand ten hours at 60° C. It is poured into ice water containing a little pyridine, stirred one hour, extracted with ether, washed with 1 N HCl, with soda solution, with water to neutrality and is then concentrated. After being chromatographed on silica gel, the yield is 1.1 g. androstane - 1α,3α,17β - triol-17β-caproate, M.P. 143–144° C.

EXAMPLE 9

Twenty g. androstane-1α,17β-diol-3-one-17β-acetate are dissolved in 1.6 liter methanol and 51 ml. water. 2.58 g. sodium boron hydride are added with stirring at room temperature, followed by another 50 minutes of stirring. The mixture is then poured into 14 liters of ice water and the solution saturated with table salt. The resulting precipitate is filtered with suction, washed neutral and dried. For separation of the 3α and 3β isomeric mixture (21 g.), the substance is chromatographed on silica gel. After elutriation with chloroform the yield is about 7 g. androstane-1α,3α,17β-triol-17β-acetate. M.P. 200–201° C. After further elutriation, the corresponding 3β-17-acetate is obtained. M.P. 165–166° C.

EXAMPLE 10

Two g. androstane - 1α,3α,17β - triol - 3α,17β-diacetate are dissolved in 150 ml. methanol and then reacted with 10 ml. saturated soda solution. The reaction solution is then boiled 30 minutes under nitrogen with reflux. The reaction mixture is then neutralized with acetic acid, concentrated under vacuum, precipitated in ice water, the precipitate filtered off with suction, washed and dried. The crude product (1.7 g.) is purified on silica gel by chromatography. The yield is 885 g. pure androstane-1α,3α,17β-triol-3-acetate with a M.P. of 201–202° C.

EXAMPLE 11

Ten g. androstane-1α,17β-diol-3-one - 17β - acetate are dissolved in 70 ml. pyridine in the cold, whereupon 35 mg. acetic anhydride are added. The solution is allowed to stand three days at room temperature. It is then stirred into one liter ice water, filtered off under suction, washed neutral and dried. The crude product (10.5 g.) is fractionated by recrystallization from isopropyl ether. The yield is 5.7 g. pure androstane-1α,17β-diol-3-one-1α,17β-diacetate, melting at 175°–176.5° C.

Ten g. androstane-1α,17β-diol-3-one-1α,17β - diacetate are dissolved in 2.4 liters of methanol and 60 ml. water. To this solution 1.55 g. sodium boron hydride are added in portions and stirred 15 minutes thereafter. The mixture is then poured into 15 liters of ice water with stirring and the solution saturated with table salt. The precipitate is filtered off with suction, washed neutral and dried with a yield of 11.7 g. For separation of the 3α and 3β isomeric mixture the material is deposited in thin layers on plates and separated in chloroform/acetone (90:10). The more rapidly migrating androstane-1α,3α,17β-triol-1,17-diacetate is extracted from silica gel with methanol and is recrystallized from isopropyl ether. M.P. 146–147° C.

EXAMPLE 12

1.3 g. androstane-1α,3α,17β-triol-1α,17β-diacetate are dissolved in 150 ml. methanol and 1.2 g. potassium carbonate disolved in some water is added. The solution is heated 15 minutes to 50° C. and then rapidly cooled, neutralized with glacial acetic acid, poured into water, the methanol drawn off, and the resulting precipitate filtered off with suction. The crude substance thus obtained is chromatographed on silica gel. The yield is 830 g. androstane-1α,3α,17β-triol-1α-acetate. M.P. 201–202° C.

EXAMPLES OF PREPARATION OF INJECTABLE PREPARATIONS.—EXAMPLE A 50 g. androstane-1α,3α,17β-triol-3-acetate are dissolved in a mixture of 6 parts by volume of sesame oil and 4 parts by volume benzyl benzoate and enough of the same mixture then added to produce a total volume of 1,000 liters. The solution is then subjected to sterile filtration through a bacterial filter (Seitz, EKS LL) and loaded into ampules under aseptic conditions with 50 mg. active substance in each ampule.

EXAMPLE B 100 g. androstane-1α,3α,17β-triol-17β-caproate are dissolved in sufficient sesame oil for a total volume of 1,000 liters. The solution is filtered sterile and under aseptic conditions ampules are filled with 100 mg. active substance in each.

Instead of the sesame oil, other oils suitable for injection can be used such as peanut oil, cottonseed oil, castor oil, etc.

For the manufacture of tablets and dragees, the active substance, preferably the free androstane-1α,3α,17β-triol and its esters with lower acids, are combined with inert carrier substances, e.g. corn starch, starch paste, sugar, sugar syrup, magnesium stearate, flavouring agents, wax, etc. to form tablets and dragees containing from 0.5 mg. to 20 mg. of the active substance.

Whereas the higher esters of androstane-1α,3α,17β-triol having prolonged activity are administrated by injection in a dosage unit from 10 mg to 200 mg., and may be applied in intervals of 1 to 6 weeks, the effective dosage of the compounds for peroral administration comprises from 0.05 mg. to 0.5 mg./kg. a day.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. Androstane - 1α,3α,17β - triol and esters thereof of fatty acids containing 2–11 carbon atoms.
2. A compound selected from the group consisting of:
    Androstane-1α,3α,17β1triol,
    Androstane-1α,3α,17β-triol-3-acetate,
    Androstane-1α,3α,17β-triol-3α,17β-diacetate,
    Androstane-1α,3α,17β-triol-17β-acetate,
    Androstane-1α,3α,17β-triol-1α,3α,17β-triacetate,
    Androstane-1α,3α,17β-triol-1α,3α - dicaproate - 17β-acetate,
    Androstane-1α,3α,17β-triol-17β-caproate,
    Androstane-1α,3α,17β-triol-1α-acetate,
    Androstane-1α,3α,17β-triol-1,17-diacetate, and mixtures thereof.
3. Androstane-1α,3α,17β-triol.
4. Androstane-1α,3α,17β-triol-3α,17β-diacetate.
5. Androstane-1α,3α,17β-triol-17β-acetate.
6. Androstane-1α,3α,17β-triol-1α,3α,17β-triacetate.
7. Androstane-1α,3α,17β-triol-1α,3α - dicaproate - 17β-acetate.
8. Androstane-1α,3α,17β-triol-17β-caproate.
9. Androstane-1α,3α,17β-triol-1α-acetate.
10. Androstane-1α,3α,17β-triol-1,17-diacetate.
11. The method of treating with anabolically active healing agents comprising contacting the body with a compound selected from the group consisting of:
    Androstane-1α,3α,17β-triol,
    Androstane-1α,3α,17β-triol-3α,17β-diacetate,
    Androstane-1α,3α,17β-triol-17β-acetate,
    Androstane-1α,3α,17β-triol-1α,3α,17β-triacetate,
    Androstane-1α,3α,17β-triol-1α,3α-dicaproate - 17β - acetate,
    Androstane-1α,3α,17β-triol-17β-caproate,
    Androstane-1α,3α,17β-triol-1α-acetate,
    Androstane-1α,3α,17β-triol - 1,17 - diacetate, and mixtures thereof.
12. A pharmaceutical composition in unit dosage form comprising 0.5 to 200 mg. of a compound selected from the group consisting of
    Androstane-1α,3α,17β-triol,
    Androstane-1α,3α,17β-triol-3α,17β-diacetate,
    Androstane-1α,3α,17β-triol-17β-acetate,
    Androstane-1α,3α,17β-triol-1α,3α,17β-triacetate,
    Androstane-1α,3α,17β-triol-1α,3α-dicaproate - 17β - acetate,
    Androstane-1α,3α,17β-triol-17β-caproate,
    Androstane-1α,3α,17β-triol-1α-acetate, Androstane-1α,3α,17β-triol-1,17-diacetate, and mixtures thereof, and an inert carrier.

References Cited by the Examiner

UNITED STATES PATENTS 2,833,792  5/1958  Dodson et al. _____ 260—397.4
2,851,454  9/1958  Pappo et al. _____ 260—239.55

OTHER REFERENCES

Dodson et al., J. Org. Chem., vol. 27, Sept. 1962, pages 3159–3164.

Johnson et al., J. Org. Chem., vol. 27, June 1962, pages 2205–07.

LEWIS GOTTS, *Primary Examiner.*

HENRY A. FRENCH, *Assistant Examiner.*